United States Patent
Brener et al.

(10) Patent No.: US 6,704,519 B1
(45) Date of Patent: Mar. 9, 2004

(54) OPTICAL TRANSMISSION SYSTEM WITH REDUCED KERR EFFECT NONLINEARITIES

(75) Inventors: Igal M. Brener, Westfield, NJ (US); Benny Peter Mikkelsen, Atlantic Highlands, NJ (US); Karsten Rottwitt, Basking Ridge, NJ (US); Jason Blain Stark, Holmdel, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/519,654

(22) Filed: Mar. 6, 2000

(51) Int. Cl.[7] .......................... H04B 10/00; H04B 10/12
(52) U.S. Cl. .................. 398/160; 398/150; 398/157
(58) Field of Search ................. 359/161, 174, 359/334, 300; 398/147, 150, 157, 160

(56) References Cited

U.S. PATENT DOCUMENTS

| | | | | |
|---|---|---|---|---|
| 4,769,820 A | * | 9/1988 | Holmes | 372/33 |
| 5,058,974 A | * | 10/1991 | Mollenauer | 385/27 |
| 5,365,362 A | * | 11/1994 | Gnauck et al. | 359/174 |
| 5,532,868 A | | 7/1996 | Gnauck et al. | |
| 5,596,667 A | | 1/1997 | Watanabe | |
| 5,777,770 A | | 7/1998 | Naito | |
| 5,798,853 A | | 8/1998 | Watanabe | |
| 5,920,588 A | | 7/1999 | Watanabe | |
| 6,160,942 A | * | 12/2000 | Watanabe | 385/122 |

OTHER PUBLICATIONS

M. H. Chou, I. Brener, G. Lenz, R. Scotti, E. E. Chaban, J. Shmulovich, D. Philen, S. Kosinski, K. R. Parameswaran, M. M. Fejer, "Efficient Wideband and tunable, mid–span spectral invertor using cascaded non–linearities in LiNbO$_3$ Waveguides" to be published in IEEE Photonics Technology Letters.

M.H. Chou, I. Brener, M.M. Fejer, E.E. Chaban, S.B. Christman "1.5 $\mu$m–Band Wavelength Conversion Based on Cascaded Second–Order Nonlinearity in Li NbO$_3$ Waveguides" IEEE Photonics Techology Letters, 1999.

M. Chou et al., "1.5 mm–Band Wavelength Conversion Based on Cascaded Second–Order Nonlinearity in LiNbO3 Waveguides", IEEE Photonics Technology Letters, vol. 11, No. 6, Jun. 1999.*

D. Breuer et al., "Upgrading the Embedded Standard–Fiber Network by Optical–Phase Conjugation", IEE Proc. Optoelectron, vol. 143, No. 3, Jun. 1996.*

* cited by examiner

*Primary Examiner*—Jason Chan
*Assistant Examiner*—Shi K. Li

(57) ABSTRACT

An optical transmission system is formed to include an optical phase conjugator at alternate repeater sites to minimize the presence of four-wave mixing and other Kerr effect nonlinearities in systems using optical fiber transmission paths (particularly in systems using DWDM and launching relatively high power signals into the low dispersion fiber). Raman gain is included in each fiber span (or in alternate fiber spans) so as to provide a "negative absorption" along the length of the fiber and thereby provide for essentially symmetrical power distribution along the length of each span, where the presence of such a symmetric,power distribution on each side of an optical phase conjugator has been found to significantly improve its performance.

10 Claims, 5 Drawing Sheets

OPTICAL TRANSMISSION SYSTEM WITH REDUCED KERR EFFECT NONLINEARITIES

TECHNICAL FIELD

The present invention relates to a high speed optical transmission system and, more particularly, to an optical transmission system utilizing optical phase conjugation with included Raman amplification to reduce the presence of four-wave mixing and other Kerr effect nonlinearities in the transmission fiber.

BACKGROUND OF THE INVENTION

In optical communication systems which utilize optical fiber as a transmission medium, chromatic dispersion and fiber nonlinearities present significant obstacles to achieving higher system data rates and longer repeater-less transmission distances. Chromatic dispersion, often simply referred to as "dispersion", refers to a phenomenon in which the speed of an optical signal through an optical transmission medium (such as fiber) varies as a function of the optical signal wavelength. The problem of chromatic dispersion is particularly significant in the standard single mode fiber (SMF) making up much of the world's existing optical transmission system infrastructure. Standard SMF typically exhibits a dispersion zero at a wavelength of about 1330 nm, with positive dispersion for wavelengths longer than the dispersion zero.

Dispersion can be expressed in terms of variations in the propagation constant of the fiber with respect to frequency. First- and second-order group velocity dispersion refer to the second and third derivatives of the fiber propagation constant $\beta$ with respect to angular frequency $\omega$, or $\beta_2$ and $\beta_3$, respectively. Higher order dispersion terms can be approximated as zero in most applications. When used in the context of lightwave transmission systems, first- and second-order dispersion are commonly expressed in terms of derivatives with respect to wavelength. Thus, first-order group velocity dispersion is typically expressed as a change in pulse propagation time over a unit length of fiber with respect to a change in pulse wavelength. In this case, the symbol $D(\lambda)$ is often used to refer to first-order group velocity dispersion, and the units are typically picoseconds per nanometer-kilometer (ps/nm-km). Second-order group velocity dispersion is then expressed, using units of $\lambda\text{ps/nm}^2\text{-km}$, as the derivative with respect to the wavelength of $D(\lambda)$.

Besides chromatic dispersion, Kerr-effect non-linearities inherent within the glass fiber can limit its transmission capabilities. In these non-linearities, the index of refraction increases with the intensity of an applied optical signal. Changes in the fiber index of refraction modulate the phase of an optical signal passing through the fiber, and thereby redistribute the signal frequency spectrum. In multi-channel systems, in which one signal causes modulation of other signals, this phenomenon manifests itself as unwanted spectral sidebands surrounding the signal wavelength. These non-linearities are usually classified as four-wave mixing (FWM), self-phase modulation (SPM) and cross-phase modulation (XPM). For long distance communication over optical fiber, dispersion and nonlinearities must be controlled, compensated, or suppressed.

Furthermore, these nonlinearities become even worse as the optical power launched into the fiber increases. As the information carried along the optical fibers is modulated at faster and faster rates, the power being used per channel rises, with a corresponding worsening of optical nonlinearities. At the same time, fibers with low dispersion are also being widely deployed and optical systems with dense wavelength division multiplexing (DWDM) are viewed as the solution for an increasing need in information capacity. These two last factors also contribute to exacerbate the generation of the above-mentioned unwanted spectral sidebands due to FWM. Moreover, XPM and SPM penalties also increase when fiber with low dispersion is used, as well as when the channel spacing is reduced. Techniques for lowering the optical power present in these sidebands and to reduce those nonlinearities are thus highly desirable for optical telecommunication systems.

One prior art technique for overcoming the presence of these nonlinearities is the use of mid-span optical phase conjugation. Because the phase conjugate of an optical pulse is, in effect, a time reversal of the pulse, an optical phase conjugator placed at the midpoint of an optical fiber span allows the first-order group velocity dispersion of the first half of the span to be compensated by the identical first-order group velocity dispersion produced as the conjugated signal propagates along the second half of the span. U.S. Pat. No. 5,798,853 issued to S. Watanabe on Aug. 25, 1998 describes one such prior art optical phase conjugation arrangement. As discussed, mid-span optical phase conjugation (OPC) can reduce the overall non-linearities in the fiber, based on the same time reversal argument, as long as the absorption in the fiber is low.

A remaining problem with this and other prior art solutions to the fiber nonlinearity problem is that optical phase conjugation is only applicable in situations where the fiber absorption is low. Since absorption is naturally a function of the length of the fiber, the prior art optical phase conjunction technique is best suited for short-span situations. Since the industry trend is toward longer and longer spans (and since nonlinearities are, in fact, more problematic for longer spans), a need remains for addressing the fiber nonlinearities in long-haul communication systems.

SUMMARY OF THE INVENTION

The need remaining in the prior art is addressed by the present invention, which relates to an optical transmission system utilizing optical phase conjugation with included Raman amplification to reduce the presence of four-wave mixing and other Kerr effect nonlinearities in the transmission fiber.

In accordance with the teachings of the present invention, the phase conjugation compensation is improved by inserting Raman gain in each fiber span (or in another embodiment, in alternate fiber spans) so as to provide for symmetric power distribution along the length of the fiber. By providing this gain in the specified spans, four-waving mixing and other nonlinearities are significantly reduced.

In a preferred embodiment of the present invention, each Raman amplification signal is applied as a counter-propagating signal with respect to the propagation direction of the information signal(s). Alternatively, counter-propagating Raman pumps can be used in only the fiber spans that follow the OPC device.

It is an aspect of the present invention that the Raman amplification technique for providing symmetrical power distribution surrounding an optical phase conjugator can be used with virtually any conjugator arrangement.

Other and further aspects of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
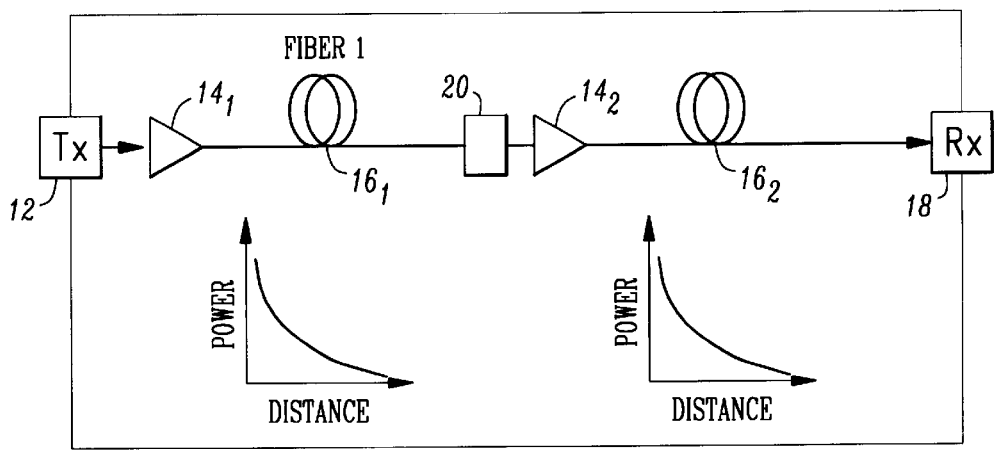
FIG. 1 illustrates a prior art optical transmission system, including a depiction of optical power distribution along the length of the system.

A prior art optical transmission system 10 utilizing optical phase conjugation is illustrated in FIG. 1. System 10 includes an optical signal transmitter 12 at one end of an optical fiber transmission path made up of a number of fiber amplifiers 14 disposed between sequential optical fiber sections 16. The amplifiers may be, for example, erbium-doped fiber amplifiers (EDFAs), which compensate for the attenuation of the optical fiber and are spaced in a manner to approximate a lossless power distribution over the entire transmission path. An optical receiver 18 is located, as shown, at the opposite end of the transmission path. System 10 also includes an optical phase conjugator (OPC) 20, located at "mid-span" of the system, which produces a phase conjugate of an input signal in order to compensate for the effects of chromatic dispersion and other nonlinearities in the fiber. OPC 20 does not require accurate knowledge of the dispersion of each fiber span, as long as the mid-point is accessible and the two resulting halves produce similar accumulated dispersion. Also shown in FIG. 1 is a (simplified) graph of the optical power distribution along each half of the transmission system.

Figure 2:
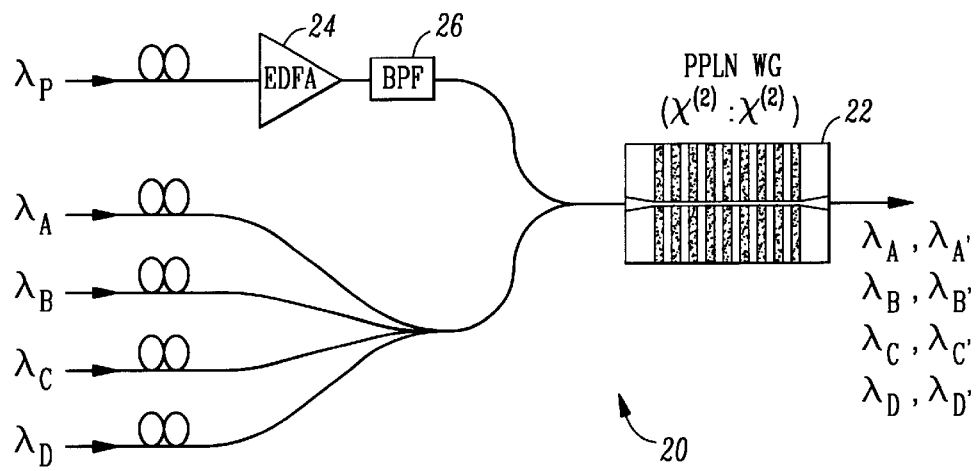
FIG. 2 illustrates an exemplary optical phase conjugator.

FIG. 2 illustrates an exemplary OPC 20, defined as a cascaded second order nonlinearity ($\chi^{(2)}$) device formed in a highly efficient nonlinear material, such as periodically poled LiNbO$_3$ (PPLN) waveguides. It is to be understood that this particular optical phase conjugator is exemplary only, and there exist in the art a variety of arrangements for providing optical phase conjugation. In general, an optical phase conjugator utilizes a strong pump signal at $\omega_p$ that is launched simultaneously with information signals at various $\omega_s$. For this particular OPC device, both pump and signals lie in the 1.5 $\mu$m band. The pump frequency is doubled to $2\omega_p$, inside the waveguide and simultaneously difference frequency mixed with the signals in order to generate wavelength-shifted outputs $\omega_{out}=2\omega_p-\omega_s$. The converted electric field is the complex conjugate of the input signal electric field, a feature that can be used to invert the chirp of the input signals.

Figure 3:
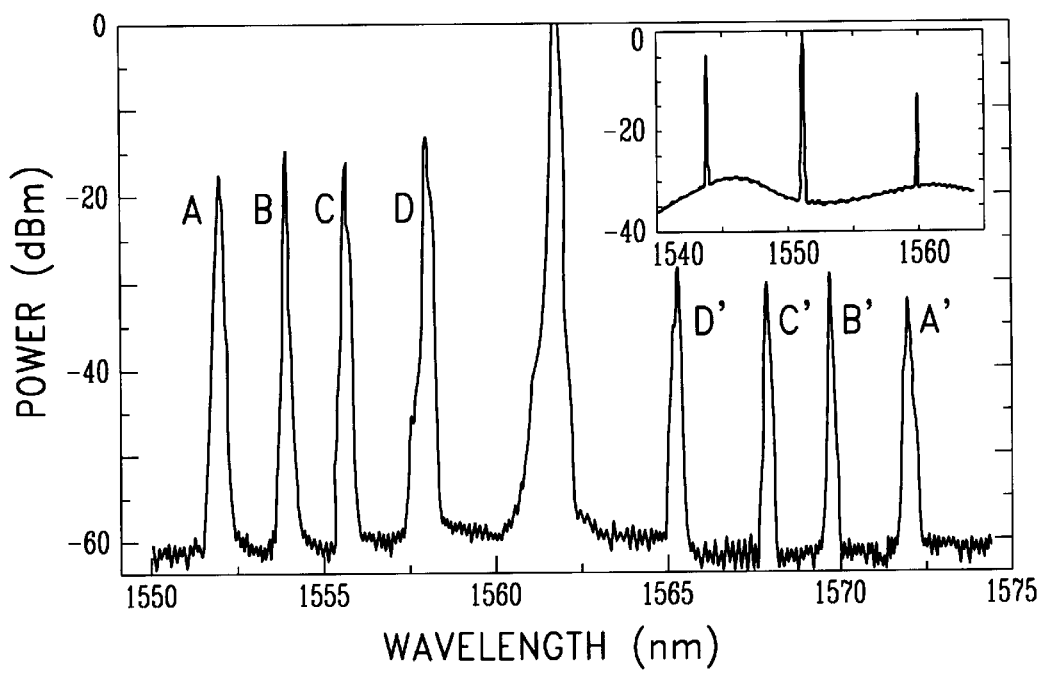
FIG. 3 is a graph illustrating the results of optical phase conjugation using the cascaded $\chi^{(2)}$ optical phase conjugator of FIG. 2.

Referring to FIG. 2, OPC 20 is illustrated as including a periodically-poled LiNbO$_3$ waveguide substrate 22 into which is coupled both a pump signal at a predetermined wavelength $\lambda_p$ and (in this example) a plurality of information signals modulated at wavelengths $\lambda_A$–$\lambda_D$. In particular, a $\chi^{(2)}$-based device for 1.5 $\mu$m band wavelength conversion uses a pump in the 1550 nm region. The pump signal is first amplified by an erbium-doped fiber amplifier (EDFA) 24 and then filtered through a bandpass optical filter 26 in order to suppress any amplified spontaneous emission (ASE) which may be present. This amplified and filtered pump signal is then combined with the four different optical signals and launched into PPLN waveguide 22. FIG. 3 illustrates the output from PPLN waveguide 22, showing both the spectrums associated with the input signals (A, B, C and D), and the phase conjugated signals (D', C', B', A') produced by PPLN waveguide 22. It is clear from the graph of FIG. 3 that the conversion efficiency for each wavelength/channel is essentially identical. Further details of the properties and workings of an optical phase conjugator can be found elsewhere in the literature and are not considered germane to the subject matter of the present invention.

Figure 4:
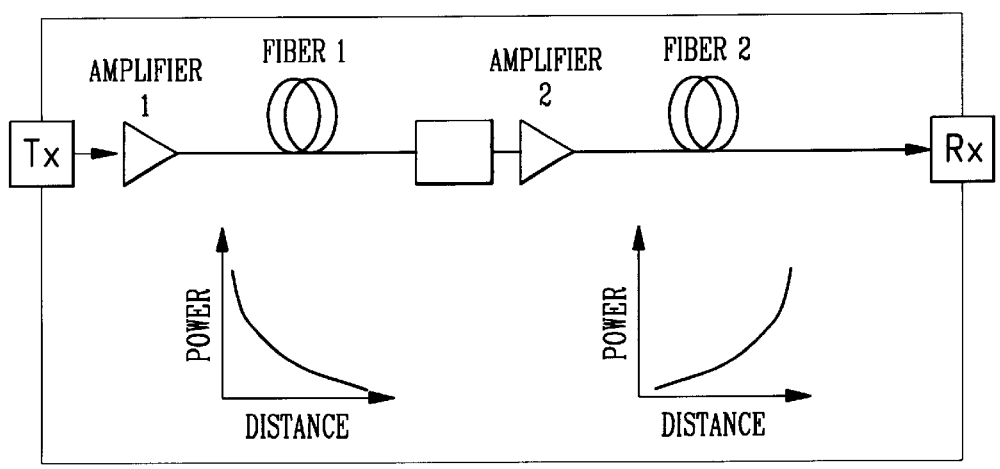
FIG. 4 is a depiction of a hypothetical optical transmission system including symmetric power distribution across the length of the transmission system.

As mentioned above, a problem with the prior art arrangement as shown in FIG. 1 is that optical phase conjugation is best suited for systems where the fiber absorption is low (from the point of view of removing nonlinearities), thus limiting the usefulness of OPC to relatively short fiber spans. Referring to FIG. 1, it is clear that the optical power is significantly reduced by the time the signal reaches OPC 20. Ideally, OPC is most effective in systems which exhibit "symmetric" power distribution, as shown in FIG. 4. Clearly, this is a hypothetical situation, since fiber absorption will always result in a decrease in power.

Figure 5:
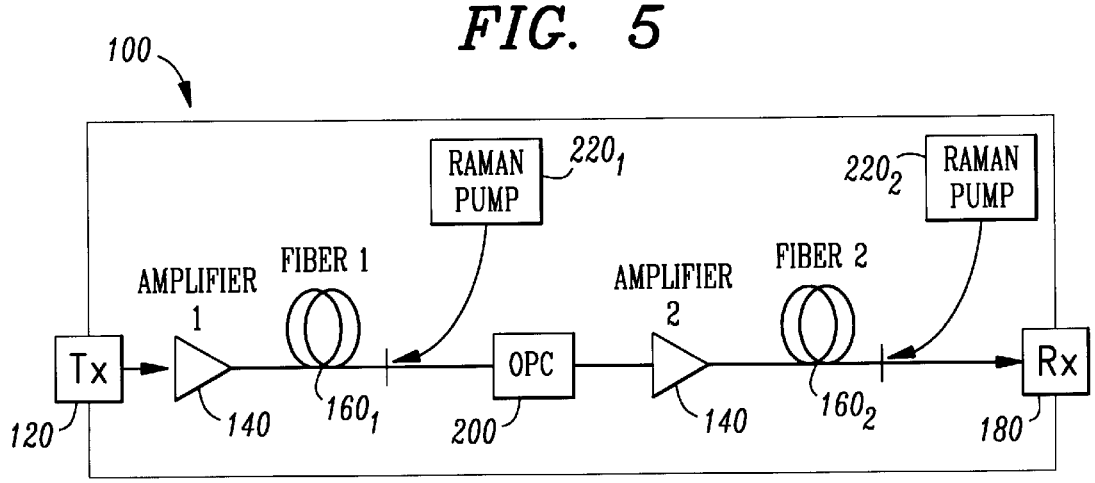
FIG. 5 illustrates an exemplary transmission system of the present invention, incorporating Raman gain into each fiber span, where counter-propagating Raman gain is introduced to provide symmetrical power distribution.
Figure 6:
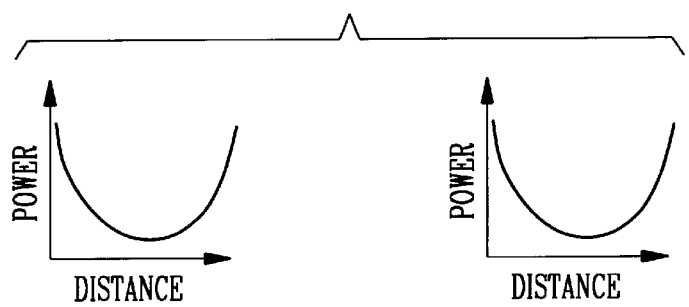
FIG. 6 is a graph illustrating the improvement in symmetrical power distribution by virtue of the inclusion of Raman gain in accordance with the present invention.

The arrangement of the present invention overcomes this limitation by inserting Raman gain in each fiber span so as to provide for "symmetric" power distribution in both halves of the transmission system. FIG. 5 illustrates an exemplary optical system 100 formed in accordance with the present invention, where components similar to those illustrated in FIG. 1 include an additional "0" in their reference numeral. In accordance with the present invention, a first Raman source 220$_1$, is included in system 100 and used to provide for amplification along first optical fiber section 160$_1$, and a second Raman source 220$_2$ is disposed as shown to provide for amplification along second fiber section 160$_2$. As a result of the Raman amplification, the optical power along each separate span will be essentially "symmetric", as shown in the optical power distribution graphs included in FIG. 6. Therefore, the performance of OPC 200 will be significantly improved and, in general, can now be used for spans of any length.

Figure 7:
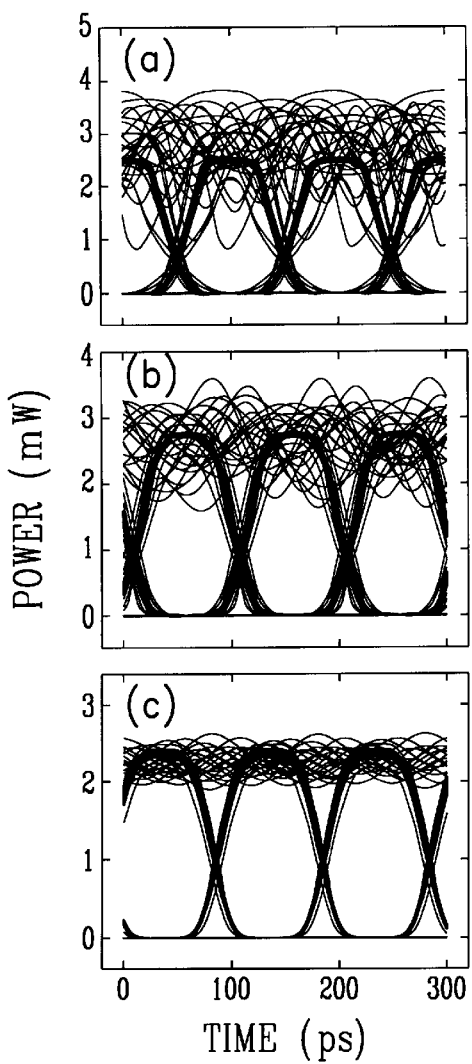
FIGS. 7(a)–7(c) contain eye diagrams associated with a 10 Gb/s WDM network, illustrating the improvement in performance using Raman amplification in accordance with the present invention.
Figure 8:
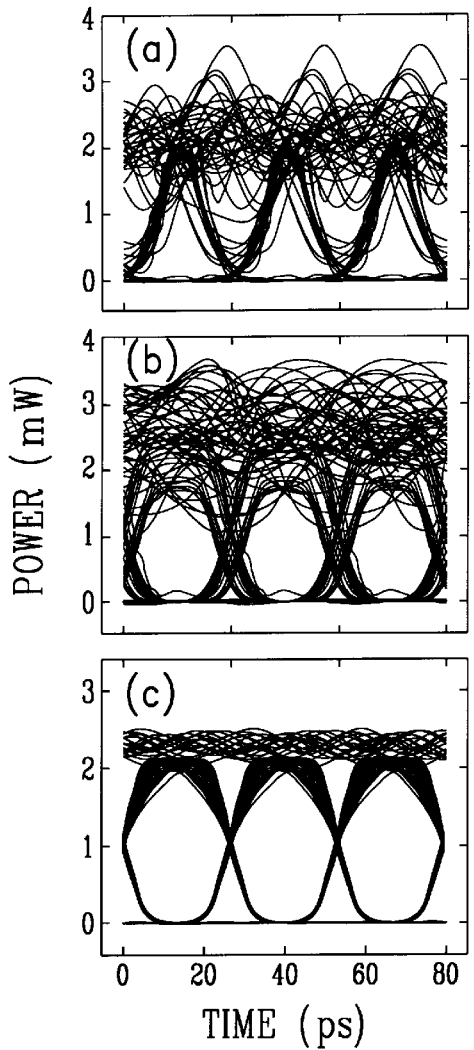
FIGS. 8(a)–8(c) contain eye diagrams associated with a 40 Gb/s WDM network, illustrating the improvement in performance using Raman amplification in accordance with the present invention.

FIGS. 7 and 8 illustrate the improvement in linearity that may be achieved by including post-OPC Raman gain in accordance with the present invention. In particular, FIG. 7(a) illustrates the "prior art" eye diagram associated with the center channel of a 10 Gb/s, 10×80 km WDM network. The center channel was chosen for analysis since this region exhibits the highest level of cross-phase modulation. FIG. 7(b) illustrates the eye diagram associated with the same channel when a conventional mid-span OPC device is used. As shown, a relatively large amount of noise remains across the "logic 1" level of the eye diagram. FIG. 7(c), in contrast, contains an eye diagram for the same central channel of the 10 Gb/s system, this time incorporating Raman amplification in the fiber span following the OPC device. FIGS. 8(a)–(c) contain similar eye diagrams for a 40 Gb/s, 10×80 km WDM network. In both cases, the inclusion of Raman amplification is shown to significantly reduce the presence of both self-phase modulation and cross-phase modulation.

Figure 9:
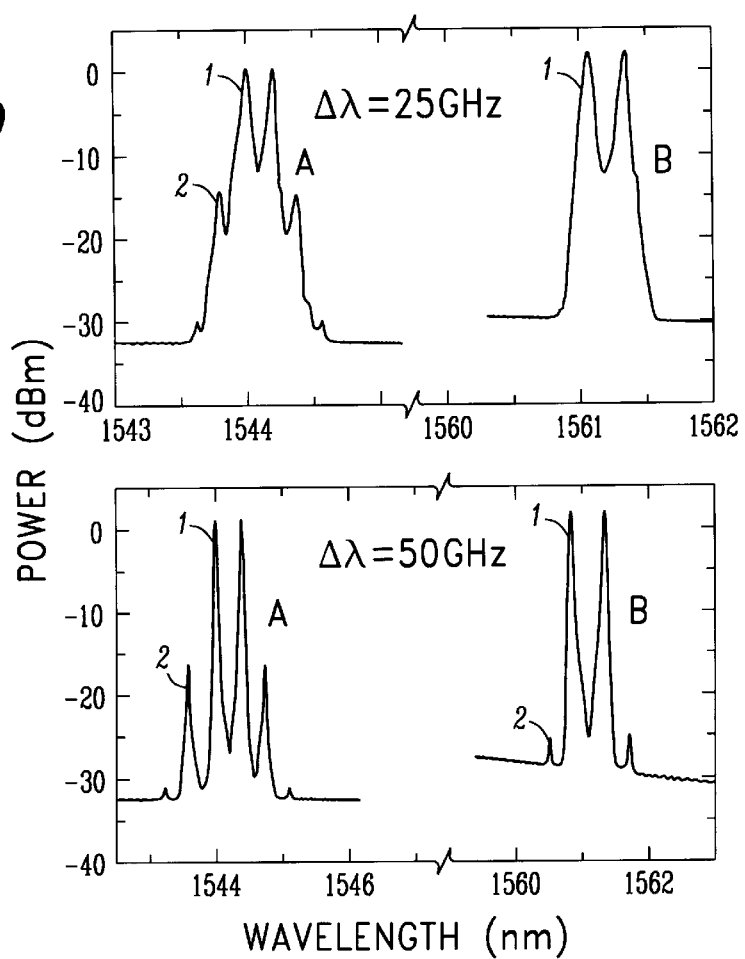
FIG. 9 is a graph comparing optical output power as a function of wavelength for a prior art system to the arrangement of the present invention, illustrating in particular the sidelobe reduction possible with the present invention.

The results achieved with the implementation of the present invention are illustrated in the graph of FIG. 9. Peaks A illustrated in FIG. 9 denote unchanged WDM channels as they propagate through 160 km of fiber. The stronger peaks (1) are the desired WDM channels; weaker peaks (2) are as a result of four-wave mixing and other nonlinearities. In contrast, peaks B are associated with a system of the present invention, clearly showing the significant reduction in four-wave mixing sidebands (i.e., the weaker peaks (2) with respect to the stronger peaks (2) of the desired WDM channels.

Figure 10:
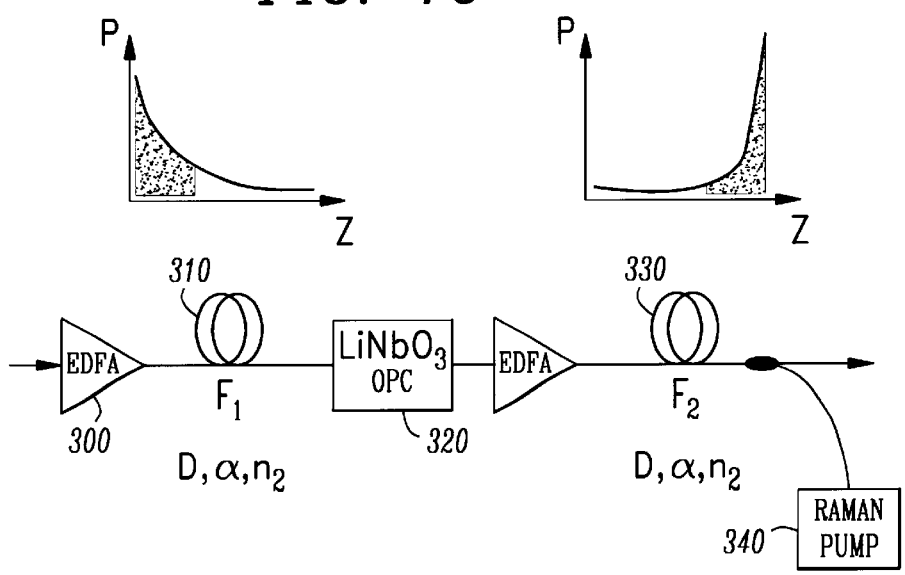
FIG. 10 illustrates an exemplary "Raman amplification unit"—including Raman gain in only the span following the OPC, where this unit may be repeated multiple times in order to reach the desired the length of an optical transmission system.

In the arrangement of the present invention as shown in FIG. 5, Raman sources 220 are disposed so as to provide for counter-propagating gain signals for both fiber spans $160_1$, and $160_2$. In its most general form, however, Kerr-effect non-linearities can be compensated, in accordance with the present invention, by including a Raman pump in only the fiber span following an OPC device. FIG. 10 illustrates this more generalized arrangement of the present invention, as well as the associated power distribution spectrums. As shown, an optical signal first passes through an amplifier 300 (preferably, an EDFA), and is coupled onto a first section of optical transmission fiber 310. The non-linear phase accumulated with the signal traversing span 310 is illustrated by the shaded portion of the power distribution associated with span 310. The optical signal then passes through an OPC 320 (similar in function to those described above), and is coupled into a second section of optical transmission fiber 330. A Raman pump source 340 is used to couple gain signal into the output end of fiber 330. The power distribution associated with this second fiber span 330 is also depicted in FIG. 10, clearly showing in the shaded region the compensation—toward the end of the fiber—that will balance the non-linearity present in the input portion of fiber section 310. In general, an arrangement such as that of FIG. 10 can be repeated many times over in order to reach the total desired length for a complete transmission system.

It is to be understood that these and other arrangements of the present invention are useful with any type of optical phase conjugation arrangement, the particular embodiment as shown in FIG. 2 is to be considered as exemplary only. In general, the subject matter of the present invention is considered to be limited only by the scope of the claims appended hereto:

What is claimed is:

1. An optical transmission system comprising
   an input optical fiber transmission span for receiving an input signal exhibiting an original phase from an optical transmitter and providing for propagation of said received input signal, said input optical fiber characterized by a known optical power absorption;
   an optical phase conjugator disposed at the endpoint of the input optical fiber transmission span for converting the original phase of the input signal to essentially remove nonlinearities attributed to transmission along the input optical fiber transmission span by forming a phase conjugated optical signal;
   an output optical fiber transmission span coupled to the optical phase conjugator for receiving the phase conjugated optical signal and providing for propagation of said phase conjugated optical signal toward an optical receiver, said output optical fiber characterized by a known optical power absorption; and
   a Raman gain element disposed to inject a counter-propagating gain signal into the output optical fiber span to provide for essentially symmetric optical power distribution between said input optical fiber and said output optical fiber.

2. The optical transmission system as defined in claim 1 wherein the optical phase conjugator is disposed at essentially the mid-point of said system such that the length of the input optical fiber is essentially equal to the length of the output optical fiber.

3. The optical transmission system as defined in claim 1 wherein the system further comprises
   a second Raman gain element disposed to inject a counter-propagating gain signal into the input optical fiber.

4. The optical transmission system as defined in claim 1 wherein the optical phase conjugator is a cascaded $\chi^{(2)}$ wavelength converter.

5. The optical transmission system as defined in claim 1 wherein an optical amplifier is disposed along the input optical fiber transmission span.

6. The optical transmission system as defined in claim 5 wherein the optical amplifier comprises an erbium-doped fiber amplifier.

7. The optical transmission system as defined in claim 1 wherein an optical amplifier is disposed along the output optical fiber transmission span.

8. The optical transmission system as defined in claim 7 wherein the optical amplifier comprises an erbium-doped fiber amplifier.

9. The optical transmission system as defined in claim 1 wherein the system further comprises
   a first optical amplifier disposed along the input optical fiber transmission span; and
   a second optical amplifier disposed along the output optical fiber transmission span.

10. The optical transmission system as defined in claim 9 wherein the first and second optical amplifiers comprise erbium-doped fiber amplifiers.

* * * * *